United States Patent Office 3,527,736
Patented Sept. 8, 1970

3,527,736
PROCESS FOR THE PREPARATION OF SYNTHETIC DIENE POLYMERS MODIFIED BY REACTION WITH CERTAIN ANHYDRIDES OR IMIDES IN THE PRESENCE OF MONO-OLEFINS
Jan W. Aeyelts Averink and Petrus J. Kok, Amsterdam, and David E. Knibbe, Delft, Netherlands, assignors to Shell Oil Company, New York, N.Y., a corporation of Delaware
No Drawing. Filed Apr. 9, 1968, Ser. No. 719,848
Claims priority, application Great Britain, Dec. 28, 1967, 58,788/67
Int. Cl. C08f 27/00, 27/08
U.S. Cl. 260—78.4                                    12 Claims

ABSTRACT OF THE DISCLOSURE

The green strength of synthetic diene polymers (lithium-polyisoprene) is improved by their reaction with an anhydride or imide of an olefinically unsaturated 1,2-dicarboxylic acid (maleic anhydride or a maleimide) in a solvent comprising 1.0–100% w. of one or more mono-olefinic hydrocarbons (amylenes).

---

This invention relates to a process for the preparation of a modified synthetic diene polymer in which process the modification is brought about by reaction with an anhydride or imide of an olefinically unsaturated 1,2-dicarboxylic acid, for example, maleic anhydride or a maleimide. As a rule, a degree of modification is envisaged which is just sufficient to obtain rubbery polymers having a desired improvement of the green strength. The term "green strength" is to be understood to mean the tensile strength of an unvulcanized composition of the modified polymer containing a reinforcing agent, in which composition the vulcanizing agents may already be present. However, modified polymers of the elastoplastic type, which polymers have a higher content of bound anhydride or bound imide, are included as well.

STATEMENT OF THE INVENTION

According to the invention the modification reaction of the diene polymer with the anhydride or imide of the olefinically unsaturated 1,2-dicarboxylic acid is carried out in a solution of the polymer to be modified in a solvent comprising 1.0–100% w. of one or more mono-olefinic hydrocarbons.

It has been found that the rate of the modification reaction accelerates when carried out in the polymer-olefin solution than when a conventional aromatic solvent, such as benzene or toluene, or an alkane, such as isooctane, is used as the sole solvent. Moreover, the gel content of the modified polymers prepared in the mono-olefin solvents according to the invention is usually lower.

Furthermore, it is surprising that under the above-mentioned conditions, as well as under the conditions to be described hereinafter, the anhydride or imide is preferentially bound to the diene polymer, and that the mono-olefinic hydrocarbons react at most only to a very small extent with the said modification agents. Even if unreacted diene monomers should be present a sufficient amount of modifying agent is bound to the polymer.

The invention can therefore be defined as a process for the preparation of a modified synthetic diene polymer by reaction of the polymer to be modified with an anhydride or amide of an olefinically unsaturated 1,2-dicarboxylic acid, said reaction being carried out in a solution of the polymer to be modified in a solvent comprising 1.0–100% w. of one or more mono-olefinic hydrocarbons.

The invention also includes the reaction with both an anhydride and an imide of the types hereinbefore defined.

The solvent to be applied preferably comprises one or more acyclic alkenes having from three to ten carbon atoms, for example, propene, the butenes, the pentenes and the hexenes. Mixtures comprising one or more of the said alkenes and optionally also one or more alkanes, for example, alkanes having the same number of carbon atoms as the said alkene(s), are also envisaged. In general, those solvents are particularly preferred whose mono-olefinic hydrocarbon content is at least 10% w,. for example, a solvent containing 15–50% w. acyclic alkenes, the remainder being mainly one or more acyclic alkanes or even one or more acyclic alkanes together with one or more acyclic alkadienes, particularly an acyclic alkadiene again having the same number of carbon atoms as the alkenes.

Although maleic anhydride and the maleimides are the most preferred modifying agent, the anhydrides and the imides of other olefinically unsaturated 1,2-dicarboxylic acids may also be applied, preferably those having four or five carbon atoms and a carbon-carbon double bond in conjugation with a carbonyl double bond, for example, of chloromaleic acid, citraconic acid (that is, methylmaleic acid) or itaconic acid (which is a tautomer of citraconic acid).

In general, the imides to be employed differ from the said anhydrides in that the

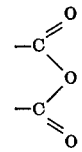

group is replaced by a

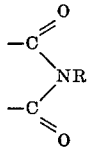

group, in which R represents a hydrogen atom or a hydrocarbyl group which may have one or more substituents. By preference, the imides of maleic acid are used, N-hydrocarbylmaleimides such as the N-aryl, the N-aralkyl, the N-alkaryl and the N-alkylimides being the most prefered representatives. Special preference is given to N-phenylmaleimide and those N-alkylmaleimides in which the alkyl group has 1–40 carbon atoms. Further particularly useful compounds are the bismaleimides, for instance, N,N'-m-phenylenebismaleimide, N,N'-ethylenebismaleimide and N,N'-hexamethylenebismaleimide. Furthermore, adducts of the said anhydrides or imides with diene monomers, for instance the adduct of one isoprene molecule with one anhydride molecule or with one imide molecule may likewise be applied.

As far as the conjugated diene polymers to be modified are concerned, preference is given to isoprene polymers and especially to synthetic high cis-1,4-isoprene polymers prepared by solution polymerization in the presence of a lithium hydrocarbyl initiator. Other very suitable diene polymers are those polymers which have also been prepared by solution polymerization, but with the aid of a catalyst formed from a hydrocarbon-soluble cobalt compound and a hydrocarbyl aluminum compound. Such polymers are, for example, the butadiene polymers.

Besides homopolymers, copolymers of two or more different dienes or of a diene with a monomer of another type, such as styrene, may be employed as the diene polymer to be modified. Suitable examples of such copolymers are butadiene-styrene copolymers prepared in solution by means of a lithium hydrocarbyl initiator.

A very attractive method for carrying out the process according to the invention can be used if the diene polymer to be modified has been prepared by solution polymerization in a mono-olefinic solution. In this case the modification reaction is preferably brought about in the polymer solution originating from such polymerization, which solution may contain up to about 22% w. of diene polymer. The method just mentioned has the advantage that no solvent switch is required. It is even possible to start the modification reaction at the moment that the polymerization reaction is to be terminated. The added anhydride or imide then acts as a terminator for the "living" polymer chain as well. Moreover, retardation of the modification reaction, which might occur owing to the presence of a previously added conventional terminator (for instance an alcohol) or molecular oxygen (which might be introduced unintentionally simultaneously with the said terminator) will thus be prevented.

The polymer solution to be subjected to the modification reaction preferably contains less than 10% w. of non-converted diene monomer. As far as the non-converted monomer reacts with part of the anhydride or imide, such a reaction is usually neither harmful nor unprofitable, for as a rule there is a large underdose of anhydride or imide with respect to the non-converted diene monomer; therefore, the reaction would result mainly in the formation of only very small amounts of a 1:1 (m./m.) adduct, which will be bound to or incorporated into the modified polymer without the latter being deteriorated.

As far as the solvents are concerned, preference is given to those mono-olefinic hydrocarbon(s) having the same number of carbon atoms as the diene monomer from which the polymer has been prepared. If, for example, the polymer to be modified is a synthetic isoprene polymer (which is especially preferred), a solvent comprising one or more pentenes will be used for choice. Thus, the modification of an isoprene polymer prepared by solution polymerization in the presence of a lithium hydrocarbyl compound and in a solvent containing one or more pentenes is preferably carried out in the polymer solution originating from the said polymerization. If the polymerization feed contains isopentane in addition to isoprene, pentene isomers and small amounts of other hydrocarbons, for instance cis- and trans-piperylene, the polymer solution in which the modification reaction is to be effected will contain mainly the same hydrocarbons. The content of unconverted isoprene is usually less than 5% w., for example, about 3% w. or even less than 1% w. As a rule the content of piperylene isomers (of which only the trans-isomer is capable of reacting with the present modifying agents) also is very low.

Preferred solvents for the modification of polybutadiene according to the invention are butene isomers or a mixture comprising one or more of them, which solvents, if so desired, may contain other hydrocarbons as well, for instance an aromatic hydrocarbon or a small amount of butadiene or both.

The reaction of the diene polymer with the anhydride or imide is preferably brought about:

(a) In the presence of an added hydrocarbon-soluble radical-yielding initiator at a temperature below 150° C., the most preferred temperature being below 110° C., or (b) In the absence of an added initiator at a temperature within the range of from 60 to 200° C., with a special preference for temperatures within the range of from 100 to 180° C., and (c) By shearing the polymer solution with a total energy of at least 100 watt hours per liter and a shear rate of at least 10,000 sec.$^{-1}$. If desired, method (c) may be combined with method (a) or method (b).

Suitable, radical-yielding initiators are organic peroxides or hydroperoxides, such as dibenzoyl peroxide, dilauroyl peroxide, cumene hydroperoxide, paramenthane hydroperoxide, diazoaminobenzene and azobisisobutyronitrile. Promoters which activate the radical-yielding initiators may, if desired, also be used.

If the modification is carried out by means of shearing, a high viscosity of the polymer solution is desired and therefore a polymer with a relatively high molecular weight and a solution with a high polymer concentration will usually be desired. The polymer concentration of the solution to be sheared is preferably at least 5% w. Shearing can be effected by conventional means, for instance, with the aid of a turbomixer or a colloid mill.

In general, it is advisable to take care that the conditions for the modification reaction, for example, with respect to temperature and pressure, are chosen so as to ensure the maintenance of a one-phase system.

The modification is preferably continued until 100 grams of the modified polymer contain at least 0.2 milligram equivalent (meq.) of ring carbonyl groups. However, sometimes a lower content of ring carbonyl groups, e.g., 0.05 to 0.2 milligram equivalent per 100 grams of modified polymer, may already be efficient, in particular when an imide is used as the modification agent. The preferred maximum content of ring carbonyl groups is 30 milligram equivalent per 100 grams of modified polymer. If one desires to prepare rubbery products, having improved green strength, preference is given to a content of ring carbonyl groups within the range of from 0.2 to 10.0 milligram equivalents per 100 grams of modified polymer, whereas thermoelastic products usually require a ring carbonyl group content of 10 to 30 milligram equivalents per 100 grams of modified polymer.

Sometimes it may be attractive to prepare mixtures of one or more modified diene polymers with one or more non-modified diene polymers, for instance, by mill blending, solution blending, blending in an internal mixer or in an extruder or by other methods known in the art.

As a rule the anhydride or the imide is added to the solution of the polymer to be modified, in a molten condition or as a solution, for example, in an aliphatic solvent, which may be identical with the solvent in which the diene polymer is dissolved, or in an aromatic solvent, such as toluene or benzene.

The modified diene polymers prepared according to the invention can be recovered from their solution by any method known in the art. As a rule an antioxidant is added to the solution (for example, after the latter has been cooled), whereupon the solvent is removed by steam-stripping.

The present process may, if so desired, be performed in a continuous manner.

The invention is illustrated by the following examples.

EXAMPLE I

A number of modification reactions (Experiment Nos. 1a, 2a, 3a, 4a and 5a) were carried out in 10% w. solutions of a synthetic isoprene polymer in a mixture comprising 57.3% w. of pentene isomers, 40.8% w. of isopentane, 0.5% w. of isoprene monomer, 0.4% w. of transpiperylene and about 1.0% w. of other hydrocarbons. The polymer had been obtained by polymerization with the aid of a lithium hydrocarbyl initiator. The I.V. (intrinsic viscosity) of the polymer, determined in toluene at 30° C., was about 7 dl./g.; its content of low-molecular-weight material having an I.V. below 1 dl./g. amounted to about 15% w.

The rubber solutions were heated to 70° C. while stirring with a ribbon stirrer. Then, per 100 parts by weight of the isoprene rubber 3 parts by weight (3 phr.) of a $C^{14}$-labelled maleic anhydride (MA) was added in a molten condition to each solution, together with a radical-yielding initiator whose name and added quantity (in phr.) are shown in Table I. The mixtures were kept at 70° C. for 4 hours, while stirring was continued. After ½, 1, 2, 3 and 4 hours samples were taken from the solutions, which samples were subjected to steam-stripping in the presence of a small amount of an antioxidant. Then the crumbs obtained were dissolved in toluene whereupon the modified polymer was precipitated from the resulting solutions by adding methanol.

The MA content of the precipitated product obtained from each sample was determined by radio active tracer analysis. The results are listed in Table I below, which also presents some other data concerning the modified products.

For comparison another series of experiments (Nos. 1b, 2b, 3b, 3f and 5b) were carried out in the same way, with exception that instead of the above-mentioned solvent, toluene was used. It will be noted that after the initial period of reaction, the samples prepared in the presence of monoolefin showed that a higher rate of reaction had occurred compared with the rate obtained in the presence of toluene.

EXAMPLE II

A number of modification reactions (Experiment Nos. 7–8, 9a, 10 and 11) were carried out in 10% w. polyisoprene solutions containing pentenes and isopentane as described in Example I. However the solutions were heated to 110° C. and brought into reaction with maleic anhydride (MA) in the absence of an added initiator. The quantity of MA added is shown in Table II.

After a reaction period of 4 hours at 110° C., while stirring continuously, the reaction mixture was subjected to steam-stripping in the presence of an antioxidant. The crumbs obtained were redissolved and the modified polymer precipitated as described in Example I, whereupon the MA content of the precipitated product was determined by radioactive tracer analysis. The results are collected in Table II which also shows the tensile strength and the elongation at break of sheets of an unvulcanized composition prepared according to the following recipe (in parts by weight):

| | |
|---|---|
| Modified rubber | 100 |
| Stearic acid | 3 |
| HAF-black | 50 |
| ZnO | 5 |
| Naphthenic mineral oil | 5 |
| N-isopropyl-n'-phenyl-paraphenylene diamine | 1 |
| Polymerized trimethyl dihydroquinoline | 1 |
| Sulfur | 2.25 |
| (N,N-oxydiethylene)2-benzothiazolesulfenamide | 0.7 |

The tensile properties were determined according to ASTM D-412-62T using die C.

Experiment No. 6 relates to the tensile properties of the polyisoprene before it was modified; the concerning data are given for comparison. Experiment Nos. 9b–9f have been performed in the same way as Experiment 9a, but with different solvents, which are indicated in the notes of Table II. The solvents used in Experiment Nos. 9b–9e do not comprise mono-olefinic hydrocarbons; the relevant results are also shown for comparison.

TABLE I

| Exp. No. | Initiator Name | Added quantity, phr. | MA bound to polymer, percent w. on modified polymer after— ½ h. | 1 h. | 2 h. | 3 h. | 4 h. | Meq. carbonyl groups per 100 g. of modified polymer after— ½ h. | 1 h. | 2 h. | 3 h. | 4 h. | Hoekstra value [1] | Content of unsoluble material (gel content), percent w.[2] |
|---|---|---|---|---|---|---|---|---|---|---|---|---|---|---|
| 1a | AIBN | 0.1 | 0.04 | 0.08 | 0.20 | 0.33 | 0.46 | 0.8 | 1.6 | 4.0 | 6.6 | 9.2 | 62 | 30 |
| 1b | AIBN | 0.1 | 0.06 | 0.10 | 0.04 | 0.23 | 0.25 | 1.1 | 2.0 | 2.8 | 4.6 | 5.0 | 60 | 70 |
| 2a | AIBN | 0.3 | 0.08 | 0.19 | 0.49 | 0.72 | 0.87 | 1.6 | 3.8 | 9.8 | 14.4 | 17.4 | 62 | 45 |
| 2b | AIBN | 0.3 | 0.10 | 0.14 | 0.27 | 0.35 | 0.41 | 2.0 | 2.8 | 5.4 | 7.0 | 8.2 | 59 | 78 |
| 3a | AIBN | 0.5 | 0.12 | 0.25 | 0.64 | 0.95 | 1.10 | 2.4 | 5.0 | 12.8 | 19.0 | 22.0 | 62 | 36 |
| 3b | AIBN | 0.5 | 0.13 | 0.20 | 0.31 | 0.37 | 0.42 | 2.6 | 4.0 | 6.2 | 7.4 | 8.4 | 62 | 78 |
| 3c | AIBN | 0.5 | 0.05 | 0.09 | 0.16 | 0.23 | 0.28 | 1.0 | 1.8 | 3.2 | 4.6 | 5.6 | 59 | 50 |
| 3d | AIBN | 0.5 | 0.04 | 0.08 | 0.16 | 0.24 | 0.31 | 0.8 | 1.6 | 3.2 | 4.8 | 6.2 | 60 | 61 |
| 3e | AIBN | 0.5 | 0.04 | 0.07 | 0.15 | 0.23 | 0.30 | 0.8 | 1.4 | 3.0 | 4.6 | 6.0 | 60 | 59 |
| 3f | AIBN | 0.5 | 0.04 | 0.08 | 0.19 | 0.28 | 0.36 | 0.8 | 1.6 | 3.8 | 5.6 | 7.2 | 61 | 68 |
| 4a | AIBN | 1.0 | 0.20 | 0.36 | 0.77 | 1.20 | 1.40 | 4.0 | 7.2 | 15.4 | 24.0 | 28.0 | 62 | 51 |
| 5a | DBPO | 0.5 | 0.12 | 0.21 | 0.40 | 0.62 | 0.81 | 2.4 | 4.2 | 8.0 | 12.4 | 16.2 | 61 | 21 |
| 5b | DBPO | 0.5 | 0.20 | | 0.34 | | 0.63 | 4.0 | | 6.8 | | 12.6 | 61 | 90 |

[1] As determined according to the method by E. W. Duck and J. A. Waterman described in Rubber Age 42 (1961) 1079–1083 with the aid of the apparatus described in Proceedings Rubber Technology Conference, London, 1938, page 362.

[2] This content relates to the quantity of material which proved to be insoluble in n-pentane at 25° C.

a=Experiments carried out in the mixture of pentenes and isopentane described: b=Experiments carried out in toluene: c=Experiments carried out in isooctane: d=Experiments carried out in methylisobutyl-ketone: e=Experiments carried out in cyclohexane: f=Experiments carried out in benzene: phr.=parts by weight per 100 parts by weight of rubber: AIBN=azo-bis-isobutyronitrile: DBPO=dibenzoylperoxide.

TABLE II

| Exp. No. | Initial MA concn., phr. | MA bound to polymer, percent w. on modified polymer | Meq. carbonyl groups per 100 g. of modified polymer | MA conversion, percent | Tensile strength, kg./cm.[2] | Elongation at break, percent |
|---|---|---|---|---|---|---|
| 6 | | | | | 1.7 | 600 |
| 7 | 0.75 | 0.04 | 0.8 | 5 | 2.4 | 900 |
| 8 | 1.5 | 0.075 | 1.5 | 5 | 6.8 | 1050 |
| 9a | 3.0 | 0.21 | 4.2 | 7 | 9.4 | 1080 |
| 9b | 3.0 | 0.12 | 2.4 | 4 | | |
| 9c | 3.0 | 0.01 | 0.2 | 0.3 | | |
| 9d | 3.0 | 0.02 | 0.4 | 0.7 | | |
| 9e | 3.0 | 0.05 | 1.0 | 1.6 | | |
| 9f | 3.0 | 0.28 | 5.6 | 9 | | |
| 10 | 5.0 | 0.45 | 9.0 | 9 | | |
| 11 | 7.0 | 0.93 | 18.6 | 13 | | | a=Carried out in the solvent mixture described in Example I.
b=Carried out in methylisobutyl ketone.
c=Carried out in isooctane.
d=Carried out in cyclohexane.
e=Carried out in benzene.
f=Carried out in a mixture of equal parts by weight of isooctane and 2-methyl-1-butene.

EXAMPLE III

A number of modification experiments (Nos. 12–17) were carried out as described in Example II. However, instead of MA the modification agent was an imide, whose name and initial concentration (in phr.) are given in Table III. This table also shows experimental results. The data of Experiment No. 6 are given again for comparison only.

TABLE III

| Exp. No. | Imide | Initial imide concn., phr. | Imide bound to polymer, percent w. on modified polymer | Meq. carbonyl groups per 100 g. of modified polymer | Imide conversion, percent | Tensile strength, kg/cm.$^2$ | Elongation at break, percent |
|---|---|---|---|---|---|---|---|
| 6 | | | | | | 1.7 | 600 |
| 12 | NPMI | 0.1 | 0.008 | 0.09 | 8 | 3.8 | 1,020 |
| 13 | NPMI | 0.3 | 0.027 | 0.31 | 9 | 4.4 | 1,080 |
| 14 | NPMI | 0.5 | 0.055 | 0.63 | 11 | 5.9 | 1,000 |
| 15 | NPMI | 1.0 | 0.15 | 1.71 | 15 | 11.1 | 1,090 |
| 16 | NPMI | 2.5 | 0.45 | 5.14 | 18 | 15.5 | 1,030 |
| 17 | NC$_{22}$ MI | 1.0 | 0.13 | 0.51 | 13 | 12.3 | 980 |

NPMI = N-phenylmaleimide.
NC$_{22}$ MI = N-(C$_{22}$ —alkyl)maleimide.

EXAMPLE IV

A series of modification experiments (Nos. 18–27) were carried out in 10% w. polyisoprene solutions containing pentenes and isopentane as described in Example I, but with the difference that dilauroyl peroxide (DLPO) was used as the radical-yielding initiator and that in some of these experiments (Nos. 24–28) N-phenylmaleimide (NPMI) was used as the modifying agent instead of MA. Further experimental conditions as well as the results obtained after the reaction period of 4 hours are summarized in Table IV, in which again, for comparison the data regarding Experiment No. 6 are shown.

TABLE IV

| Exp. No. | Modifying agent Name | Initial concn., phr. | DLPO added, phr. | MA or NPMI bound to polymer, percent w. on modified polymer | Meq. carbonyl groups per 100 g. modi- polymer | Tensile strength, kg./cm.$^2$ | Elongation at break, percent |
|---|---|---|---|---|---|---|---|
| 6 | | | | | | 1.7 | 600 |
| 18 | MA | 0.5 | 0.1 | 0.06 | 1.2 | 4.1 | 1180 |
| 19 | MA | 0.25 | 0.1 | 0.05 | 1.0 | 3.5 | 1180 |
| 20 | MA | 1.00 | 0.1 | 0.08 | 1.6 | 7.0 | 1100 |
| 21 | MA | 0.25 | 0.25 | 0.04 | 0.8 | 9.0 | 1100 |
| 22 | MA | 0.25 | 0.05 | 0.03 | 0.6 | 4 | 990 |
| 23 | MA | 0.25 | 0.01 | 0.02 | 0.4 | 1.5 | 800 |
| 24 | NPMI | 0.25 | 0.1 | 0.05 | 0.57 | 4.6 | 1010 |
| 25 | NPMI | 0.5 | 0.1 | 0.08 | 0.91 | 5.5 | 940 |
| 26 | NPMI | 1.0 | 0.1 | 0.09 | 1.03 | 5.9 | 960 |
| 27 | NPMI | 0.5 | 0.05 | 0.03 | 0.34 | 4.2 | 600 |

EXAMPLE V 129 grams of the isoprene polymer described in Example I and 5 phr. of MA were dissolved in a mixture of 500 ml. toluene with 500 ml. of the isopentane-pentene isomers mixture described also in Example I. Thereupon this solution was subjected to shearing for 90 minutes by means of a turbomixer at a shear rate of 20,000 sec.$^{-1}$, the total energy input being 150 watt hours per liter.

The tensile strength of an unvulcanized composition of the product obtained was determined as described in Example II and proved to be 6.8 kg./cm.$^2$, the elongation at break being 900%.

This experiment was repeated the only difference being that the shearing (to the same degree) of the polymer solution took place in the absence of maleic anhydride. Now, the green strength was only 2.3 kg./cm.$^2$, with an elongation at break of 610%.

EXAMPLE VI 900 milliliters of toluene were mixed with 100 ml. of a mixture containing about 20% w. isoprene, about 33% w. of isopentane and about 45% w. of pentene isomers, (the remainder being small amounts of other hydrocarbons). In this total mixture were dissolved 100 g. of the isoprene polymer described in Example I and 5 phr. of MA. Thereupon the solution obtained was sheared for 60 minutes by means of a turbomixer, the total energy input being again 150 watt hours per liter and the shear rate again 20,000 sec.$^{-1}$. The tensile strength of an unvulcanized composition of the product obtained, determined as described in Example II, was 5.4 kg./cm.$^2$ with an elongation at break of 1250%.

We claim as our invention:

1. A process for the preparation of a modified synthetic conjugated diene polymer by reaction of the rubber polymer to be modified with an anhydride or imide of an olefinically unsaturated 1,2-dicarboxylic acid, said reaction being brought about in the presence of an added hydrocarbon-soluble radical-yielding initiator at a temperature below 150° C. said reaction being carried out in a solution of the polymer to be modified in a solvent comprising 1.0–100% w. of at least one mono-olefinic hydrocarbon.

2. A process according to claim 1 in which the solvent comprises one or more acrylic alkenes having from 3 to 10 carbon atoms.

3. A process according to claim 1 in which the mono-olefinic hydrocarbon content of the solvent is at least 10% w.

4. A process according to claim 1 in which the diene polymer to be modified has been prepared by solution polymerization in a solvent of the type defined in claim 1 and the modification reaction is carried out in a polymer solution originating from the said polymerization.

5. A process according to claim 4 in which the modification reaction is started by terminating the polymerization reaction with the anhydride imide.

6. A process according to claim 4 in which the solution of the polymer to be modified contains less than 10% w. of unconverted diene monomer.

7. A process according to claim 1 in which the mono-olefinic hydrocarbon(s) and the diene monomer from which the polymer has been prepared have the same number of carbon atoms.

8. A process according to claim 7, in which the polymer to be modified is a synthetic isoprene polymer and the solvent comprises one or more pentenes.

9. A process according to claim 5 in which the polymer to be modified is an isoprene polymer prepared by solution polymerization in the presence of a lithium hydrocarbyl compound.

10. A process according to claim 1 in which the reaction with the anhydride or the imide is brought about by shearing the polymer solution with a total energy of at least 100 watt hours per liter and at a shear rate of at least 10,000 sec.$^{-1}$.

11. A process for the preparation of a modified synthetic conjugated diene polymer by reaction of the rubbery polymer to be modified with an anhydride or imide of an olefinically unsaturated, 1,2-dicarboxylic acid, said reaction being brought about in the absence of an added initiator at a temperature within the range of from 60 to 180° C.

12. A process according to claim 11 wherein the reaction with the anhydride or the imide is brought about by shearing the polymer solution with a total energy of at least 100 watt hours per liter at a shear rate of at least 10,000 sec.$^{-1}$.

References Cited

UNITED STATES PATENTS 2,824,859  2/1958  Fasce _____ 260—78.5

FOREIGN PATENTS 1,066,873  4/1967  Great Britain.

JOSEPH L. SCHOFER, Primary Examiner

C. A. HENDERSON, Jr., Assistant Examiner

U.S. Cl. X.R.

260—33.6, 79.5 94.7, 786